United States Patent

[11] 3,627,949

[72] Inventors Tihomir Krecic
Arcadia;
Irving H. Ross, Duarte, both of Calif.

[21] Appl. No. 3,031
[22] Filed Jan. 15, 1970
[45] Patented Dec. 14, 1971
[73] Assignee Western Telematic Inc.
Arcadia, Calif.

[54] DIGITAL DATA TRANSMISSION SYSTEM

10 Claims, 4 Drawing Figs.

[52] U.S. Cl. .......... 179/2 DP, 325/320
[51] Int. Cl. .......... H04m 11/06, H04l 27/14
[50] Field of Search .......... 179/2 DP; 325/30, 320; 329/112, 126; 307/233; 178/66

[56] References Cited

UNITED STATES PATENTS

| | | | |
|---|---|---|---|
| 3,165,583 | 1/1965 | Kretzmer | 325/30 |
| 3,233,181 | 2/1966 | Calfee | 325/30 |
| 3,535,456 | 10/1970 | Wilson | 325/30 |
| 3,522,539 | 8/1970 | Levine | 329/126 |
| 3,539,828 | 11/1970 | Crouse | 307/233 |
| 3,501,704 | 3/1970 | Webb | 329/112 |
| 3,466,392 | 9/1969 | Calfee | 325/30 |

*Primary Examiner*—Kathleen H. Claffy
*Assistant Examiner*—Tom D'Amico
*Attorney*—Harris, Kiech, Russell & Kern

ABSTRACT: A system for transmission of digital data on telephone-type voice circuits, which is compatible with conventional transmission equipment while being considerably smaller in size and weight. A transmitter including a multivibrator operating at two frequencies in response to mark and space signals, and a low-pass filter in the form of an operational amplifier to provide a sinusoidal output to the transmission circuit. A receiver including a band-pass amplifier, a limiter, a pulse multiplier, a multivibrator detector, a low-pass amplifier, and an output stage to produce mark and space signals corresponding to those at the input of the transmitter. The band-pass and low-pass amplifiers incorporate operational amplifiers to provide the customary filtering operation while eliminating the conventional large filter components. The multivibrator is switched to one state by the zero crossing of the input, or multiple thereof, and is switched to the other state by a precisely controlled ramp generator obtaining precision control of time and energy in the output signal.

INVENTORS
TIHOMIR KRECIC,
IRVING H. ROSS
BY THEIR ATTORNEYS
HARRIS, KIECH, RUSSELL & KERN

INVENTORS
TIHOMIR KRECIC,
IRVING H. ROSS
BY THEIR ATTORNEYS
HARRIS, KIECH, RUSSELL & KERN

INVENTORS
TIHOMIR KRECIC,
IRVING H. ROSS
BY THEIR ATTORNEYS
HARRIS, KIECH, RUSSELL & KERN

DIGITAL DATA TRANSMISSION SYSTEM

This invention relates to digital data transmission systems suitable for use on telephone-type voice circuits, both wire and radio. The system of the present invention is compatible with conventional transmission equipment while being considerably smaller in size and weight. In the conventional system, the digital data is fed into a transmitter which converts the data to a form suitable for transmission on a telephone line or a radio to a receiver. At the receiver, the incoming signal is converted back to the digital data for storage, display or further use. The incoming digital data is in the form of pulses or what is sometimes referred to as marks and spaces, with a mark typically being a voltage level of +3 volts or higher and a space being a voltage level of zero or a negative value. The transmission system of interest handles digital data in the low and medium speed ranges of 100 to 1,600 baud, with the telephone-type voice circuits handling generally sinusoidal signals in the audiofrequency range. Considerable filtering is utilized in the transmitters and receivers and at the frequencies utilized, conventional filtering requires relatively large and therefore expensive components.

The present invention contemplates a new and improved transmitter and a new and improved receiver, which may be substituted for existing transmitters and receivers, while utilizing the existing data sources, voice circuits, and data utilization equipment.

The system of the invention provides new circuitry with improved stability, linearity, and signal to noise ratio, while reducing jitter as well as size, weight and cost. The system incorporating the invention includes a transmitter with a multivibrator operating at two frequencies corresponding to marks and spaces, respectively, and a low-pass filter to provide a generally sinusoidal output for the transmission circuit, with the filter preferably comprising an operational amplifier. The system incorporating the invention includes a receiver with a band-pass filter, limiter, multivibrator detector, low-pass filter and output stage. The multivibrator detector preferably incorporates a multivibrator with a pulse multiplier for one input and a ramp generator for the other input controlling the multivibrator operation. As in the transmitter, the receiver filters preferably comprise operational amplifiers which are combined with the other components of the transmitter and receiver to produce the desired mode of operation.

The system of the invention is particularly adapted for manufacture utilizing either hybrid circuit techniques or thin film techniques.

Other advantages, features and results will more fully appear in the course of the following description. The drawings merely show and the description merely describes a preferred embodiment of the present invention which is given by way of illustration or example. The embodiment described may be designed to operate at different data rates and three variations will be described.

Figures 1, 2:
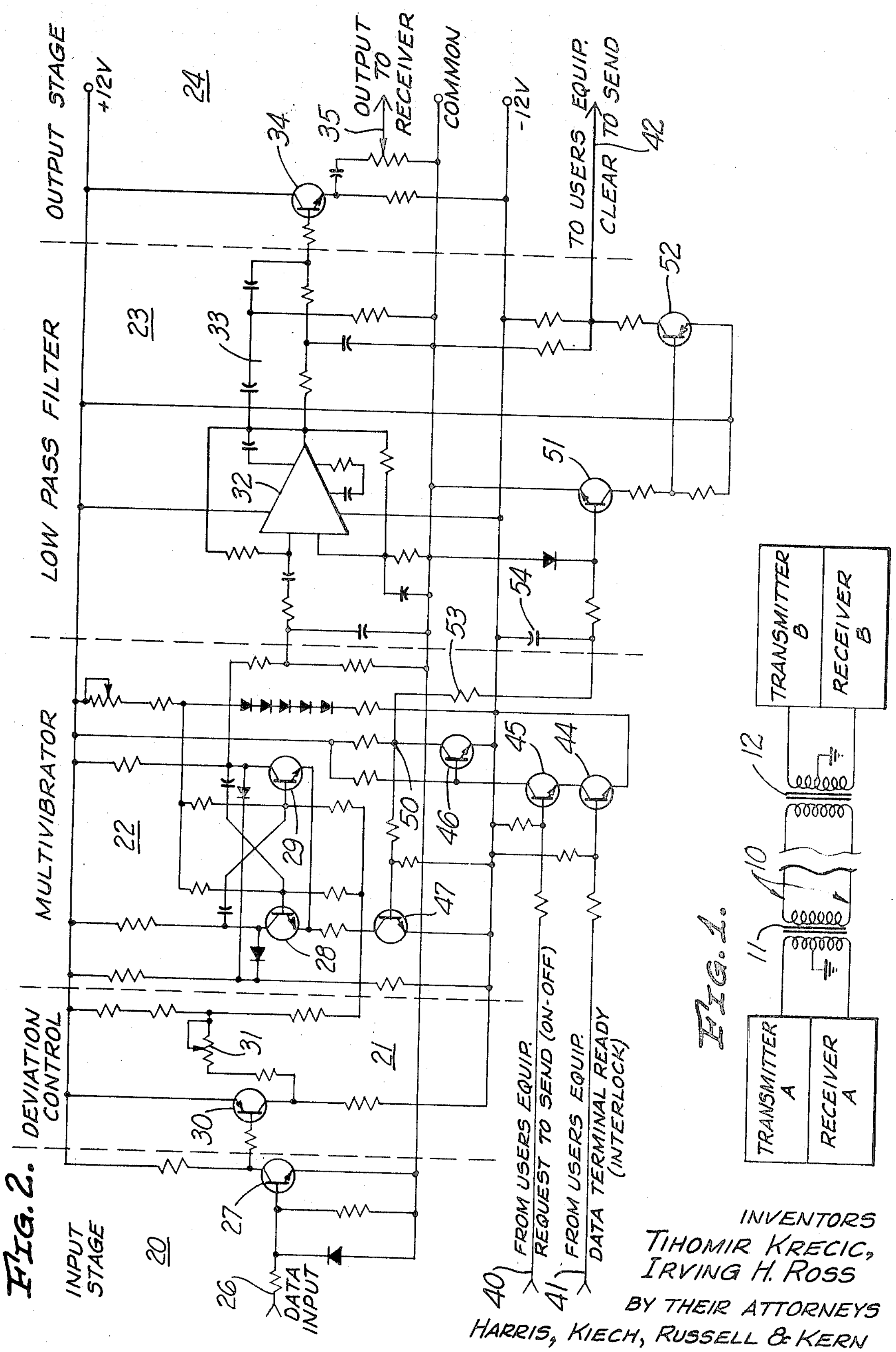
FIG. 1 is a block diagram illustrating a two-way digital data transmission system.
FIG. 2 is a schematic diagram of a preferred form of transmitter for the system of FIG. 1.

FIG. 1 illustrates an arrangement for two-way transmission on a two-wire telephone line 10. Transmitter A and receiver A are installed at one terminal and are coupled to the line by a transformer 11. Similarly, transmitter B and receiver B are installed at another terminal and are coupled to the line by a transformer 12. Transmitter A and receiver B operate on the same frequency for data transmission from terminal A to terminal B. Transmitter B and receiver A operate on the same frequency, which is different from the frequency of transmitter A, for data transmission from terminal B to terminal A. This type of arrangement is conventional and the present invention is directed to new and improved transmitters and receivers for utilization with the existing lines 10.

The transmitter of FIG. 2 includes an input stage 20, a deviation control unit 21, a multivibrator 22, a low-pass filter 23, and an output stage 24.

The digital data which is to be transmitted appears in the form of two voltage levels or marks and spaces, and is connected at input terminal 26. The input state 20 provides for signal amplification, utilizing a transistor 27. The multivibrator 22 may be a conventional multivibrator circuit incorporating transistors 28, 29 and normally operates at one of two frequencies referred to as the high and low frequencies or the space and mark frequencies. The multivibrator frequencies are controlled by the DC voltage levels at the input 26 and the deviation control unit 21 provides an adjustment for setting the values of the frequencies. The deviation control unit 21 includes a transistor 30 operated as an emitter follower, with a variable resistor 31 providing for the deviation adjustment. Deviation is the difference between the actual frequency and the nominal center frequency, e.g., with a nominal center frequency of 1,700 Hz. and a deviation of ±500 Hz., the higher frequency would be 2,200 Hz. and the lower frequency would be 1,200 Hz.

With the particular embodiment illustrated, when the voltage level at the input 26 is raised to +3 volts or higher, the multivibrator is switched to the lower or marking frequency. When the input voltage level is at zero or a negative value, the multivibrator operates at the higher or spacing frequency.

The low-pass filter 23 functions to convert the output of the multivibrator to a sinusoidal waveform which desirably should have very little distortion. In the preferred embodiment illustrated, the low-pass filtering is achieved by utilizing a high-gain amplifier 32 connected as an operational amplifier, feeding into a resistance-capacitance twin T-filter section 33. The output stage 24 includes a transistor 34 operated as an emitter follower for impedance matching, with the transmitter output appearing at terminal 35, which corresponds to terminal 35 on FIG. 3.

Figure 3:
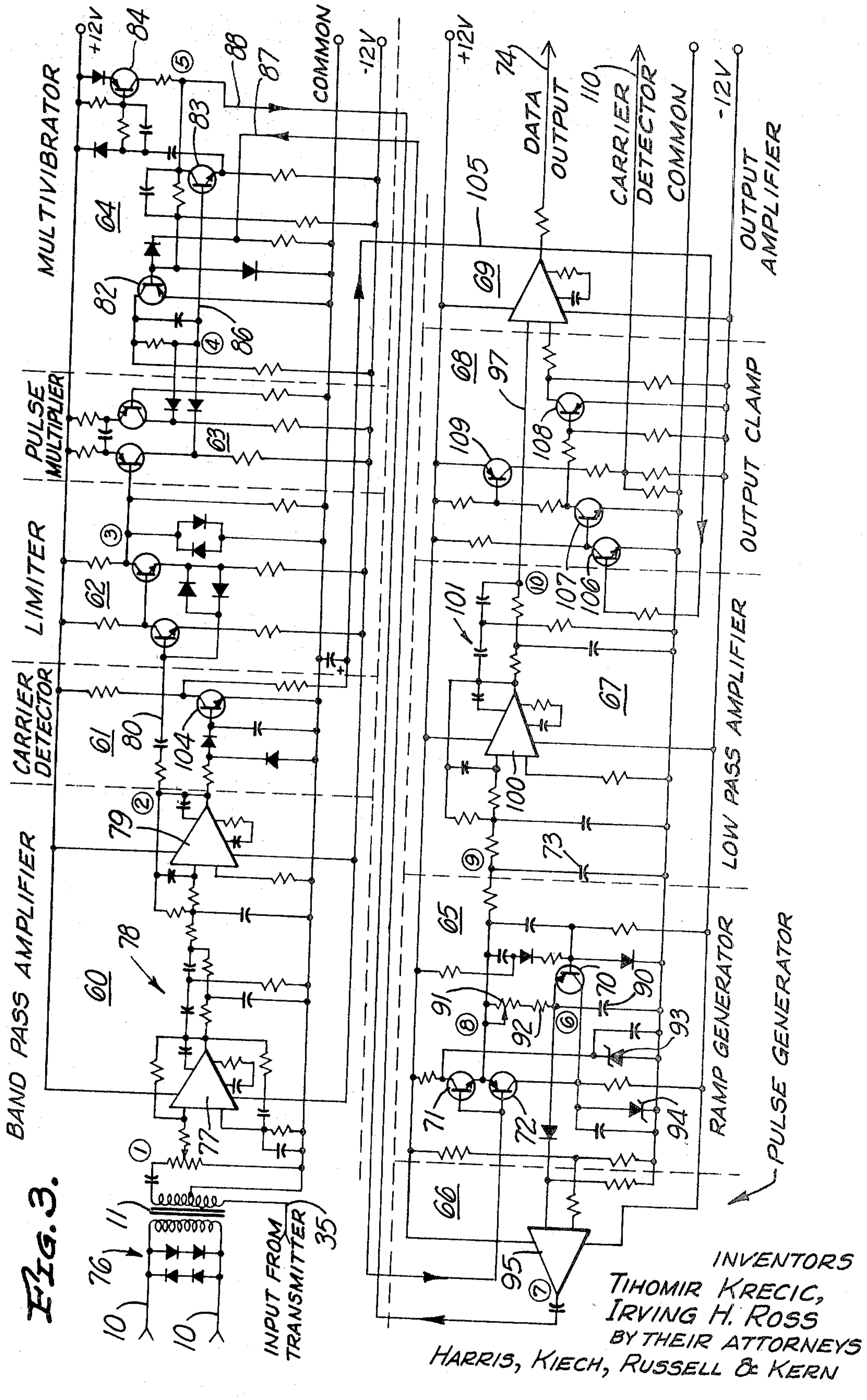
FIG. 3 is a schematic diagram of a preferred form of receiver for the system of FIG. 1.

The transmitter functions to change a binary polar or neutral DC input to either a higher or a lower frequency sine wave output, which is coupled to the telephone circuit 10 by a transformer, indicated as the transformer 11 on FIG. 3.

The terminals 40, 41 and 42 are part of the control circuits which interconnect with the user's equipment to perform the same functions as the conventional transmitter. In the particular embodiment illustrated, a +3 volt signal at terminal 41 indicates that the user's equipment is ready for operation. Similarly, a +3 volt signal at terminal 40 indicates that the user wishes to transmit data. When both +3 volt signals are present, transistors 44 and 45 conduct and turn off transistor 46 which in turn controls transistor 47 to cause the multivibrator 22 to operate at the marking frequency. The multivibrator can then be controlled by voltage level changes at the input 26. If one or the other of the +3 volt signals is not present at the terminals 40, 41, the multivibrator will be operated at a frequency higher than the high or spacing frequency, which preferably is above the limit of the low-pass filter 23 so that there is no output on the line 35.

When the voltage at point 50 is changed by the presence of the user's ready signal and the user's request to send signal, the transmitter will generate a signal on the terminal 42, via transistors 51 and 52 to indicate to the user's equipment that the transmitter is ready. A time delay between receiving the request to send signal and generating the clear to send signal may be obtained by utilizing the resistor 53 and capacitor 54.

Figure 4:
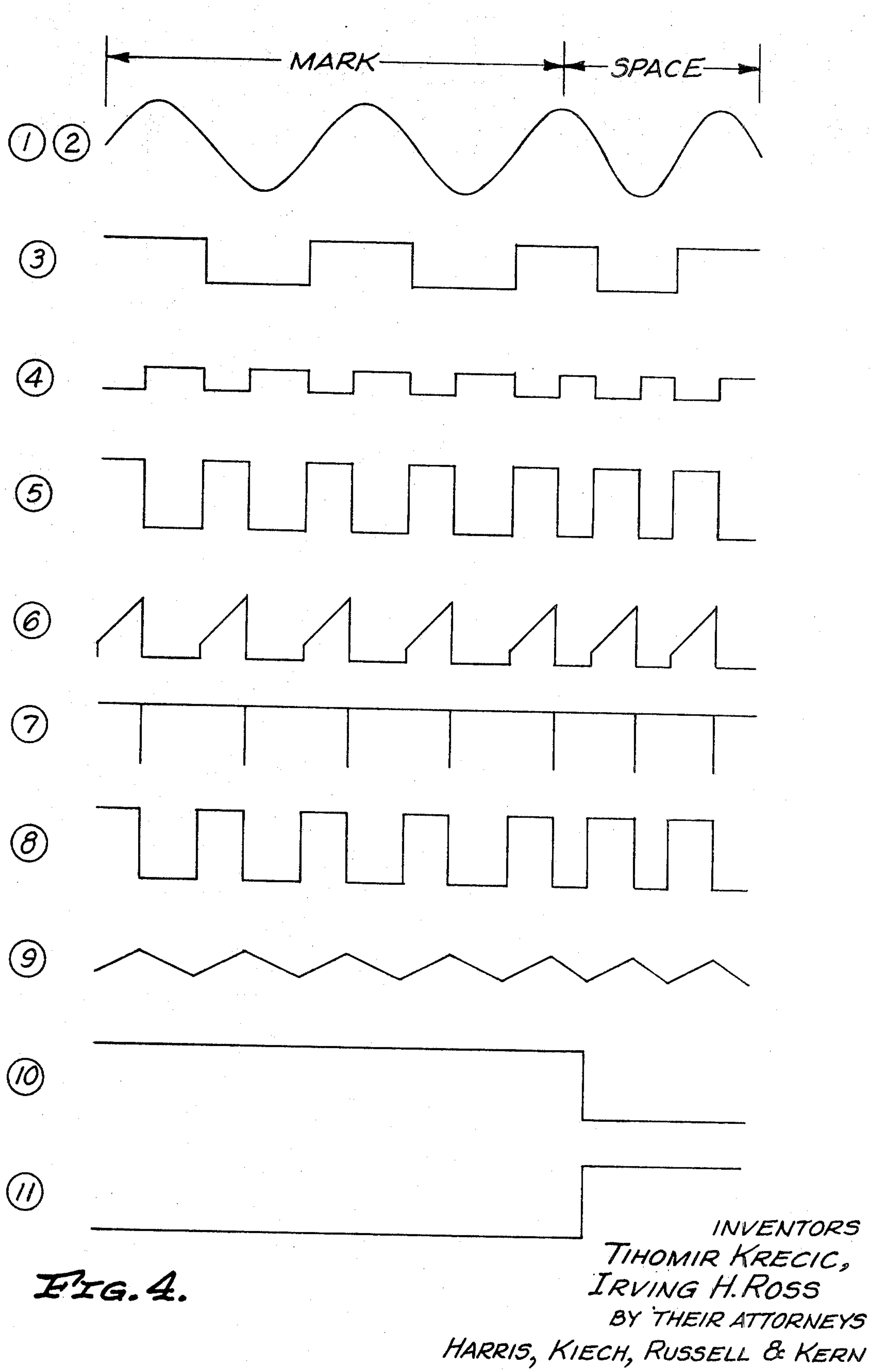
FIG. 4 is a set of diagrams illustrating the operation of the receiver of FIG. 3.

The receiver of FIG. 3 includes a band-pass amplifier 60, a carrier detector 61, a limiter 62, a pulse multiplier 63, a multivibrator 64, a ramp generator 65, a pulse generator 66, a low-pass amplifier 67, an output clamp 68, and a output amplifier 69. FIG. 4 illustrates waveforms at various points in the receiver of FIG. 3 while receiving the lower or mark frequency and while receiving the higher or space frequency. Waveforms 1 and 2 illustrate the input and output of the band-pass amplifier 60, waveform 3 illustrates the output of the limiter 62, waveform 4 illustrates the output of the pulse multiplier 63, waveform 5 illustrates the output of the multivibrator 64, waveform 6 illustrates the signal at the emitter of transistor 70 in the ramp generator 65, waveform 7 illustrates the output of the pulse generator 66, waveform 8 illustrates the signal at the emitters of the transistors 71, 72 of the ramp generator 65, waveform 9 illustrates the signal developed across the capacitor 73 at the input of the low-pass amplifier 67, waveform 10 illustrates the output of the low-pass amplifier 67, and waveform 11 illustrates the output of the output amplifier 69 at terminal 74.

The receiver accepts the frequency-shift sine wave from the transmitter via the line 10 and produces bipolar DC as an output. The transformer 11 provides DC line isolation and the diodes 76 across the line 10 act as limiters to prevent excessive voltages from damaging the input stages of the receiver.

The band-pass amplifier 60 functions to pass the marking and spacing frequencies while rejecting frequencies outside of the pass band defined by the marking and spacing frequencies. In the preferred embodiment illustrated, the band-pass amplifier includes a high-gain amplifier 77 connected as an operational amplifier, a resistance-capacitance T-filter 78 and another amplifier 79 connected as an operational amplifier to provide the desired band-pass filter operation without the customary large filter components.

The band-pass amplifier output is connected to the limiter 60 via line 80. The limiter functions in the usual manner to amplify and clip the sinusoidal signal to provide a square wave signal with voltage level changes related in time to the zero crossings of the sinusoidal signal. The limiting operation prevents amplitude modulation interference with the frequency modulation detection.

The pulse multiplier 63 functions to increase the incoming pulses by a predetermined multiple or increase the input frequency. The effect of the increase in frequency is to increase the resolution and the signal-to-noise ratio in the detection circuitry which follows. In the specific circuit illustrated, the input frequency is quadrupled. The waveforms in FIG. 4 indicate only a doubling of frequency for purposes of clarity. While the pulse multiplier is a desirable feature of the embodiment illustrated, it is not essential to the operation of the receiver and the multivibrator could be operated at the frequencies of the incoming signal with decreased performance.

The multivibrator 64, the ramp generator 65 and the pulse generator 66 function as a multivibrator type of detector for the frequency modulation signal. Transistors 82, 83 are connected in a conventional multivibrator circuit and transistor 84 provides a clamp. The multivibrator is switched to one state by a negative-going voltage change in the output of the pulse multiplier 63 on line 86, and is switched to the other state by a negative pulse from the pulse generator 66 on line 87. When the multivibrator is switched to the first state, the positive voltage at the output on line 88 serves to switch the transistors 71, 72 into conduction and capacitor 90 of the ramp generator is charged through resistors 91, 92. The charging of the capacitor 90 produces a ramp voltage as illustrated in waveform 6 of FIG. 4. The initial vertical step in the ramp is caused by the zener clamp 93. When the voltage of the ramp rises to a specific predetermined value, determined by the other zener clamp 94, transistor 70 conducts. The negative-going change at the termination of the ramp is coupled as an input to amplifier 95 of the pulse generator 66, which in turn produces the negative-going pulse illustrated in waveform 7 of FIG. 4, on line 87 to cause a change in state of the multivibrator.

The ramp generator provides precise control of the time the multivibrator is in one state, sometimes referred to as the time the multivibrator is on, and thereby a precise control of the amount of energy delivered to the capacitor 73 at the input of the low-pass amplifier 67. The on time for the multivibrator is always the same, while the off time depends upon the input frequency. Precise control of the on time is important because the integrated energy determines the switching point.

The low-pass amplifier 67 functions as a low-pass filter and in effect removes the carrier, providing a DC voltage output which is proportional to the pulse rate of the multivibrator. As illustrated in waveform 10 of FIG. 4, the output on line 97 has one DC level for a mark and another DC level for a space. The output amplifier 69 raises the level of the output signal to plus or minus 6 volts and inverts the polarity to provide the same output as the conventional system.

The specific embodiment of the low-pass amplifier illustrated incorporates an amplifier 100 connected as an operational amplifier and a resistance-capacitance T-filter 101 to achieve the desired filtering without the use of large filter components.

The carrier detector 61 and output clamp 68 are incorporated to provide a steady state output when there is no input signal from the line 10 or when the input falls below a predetermined level. The output of the band-pass amplifier 60 is connected to the base of a transistor 104 and when the signal level exceeds a predetermined value, determined by the amplitude of the input signal, the transistor 104 is turned on to produce a signal on line 105. This signal is connected as one input to the output amplifier 69 through transistors 106, 107 and 108. When line 105 is in the no-signal condition, the output from the amplifier 69 remains at the mark signal condition, regardless of the voltage level at the input line 97. When line 105 is in the signal condition, the output of the amplifier 69 is controlled by the signal on the line 97. Transistor 109 is controlled by transistor 107 to provide a carrier detect signal at terminal 110 for the user's equipment.

The frequency-shift transmitter and receiver of the present application provides the desired digital data handling without utilizing conventional frequency-shift circuitry or large components associated with filters. This provides a marked reduction in size and weight. By way of example, an existing system which is replaced by the embodiment illustrated herein weights approximately 15 pounds and occupies a 10-inch cube. The system of the invention weights less than 8 ounces and occupies a 3-inch cube.

The system of the invention may be constructed to operate at various frequencies and bandwidths, depending upon the data rate desired. For example, one version may utilize 12 channels on a voice circuit, i.e., 12 transmitters and 12 receivers at each end of the circuit. The channels may be spaced at 240 Hz. with a frequency shift of ±75 Hz., providing a data rate of 150 baud. Another version may utilize a full duplex two-wire line with 1,000 Hz. spacing between channels and a data rate of 300 baud. A third version may utilize a half-duplex two-wire line or a full duplex four-wire line with a data rate of 1,200 baud.

I claim:

1. In a system for transmission of digital data on telephone-type voice circuits and the like, including transmitter means for generating a sinusoidal output signal having two frequencies with one frequency corresponding to a mark signal and with the other frequency corresponding to a space signal of a digital input signal, and including means for coupling said sinusoidal signal to a voice circuit for transmission to a receiver, and receiver means for generating a digital output having two voltage levels corresponding to the marks and spaces of said transmitter digital input signal, and including means for coupling the voice circuit to said receiver means, the improvement wherein said receiver means includes in combination:

first circuit means having said sinusoidal output signal as an input for generating a square wave signal having voltage level changes related in time to the zero crossings of said sinusoidal signal;

a multivibrator having first and second states producing first and second output voltage levels in response to first and second multivibrator input signals, respectively, with the output of said first circuit means connected as said first multivibrator input signal;

second circuit means for generating said second multivibrator input signal at a predetermined time after each change of said multivibrator from said second output voltage level to said first output voltage lever, with said multivibrator operating at a higher frequency for one of said mark and space signals and at a lower frequency for the other of said mark and space signals; and first filter means having the output of said multivibrator as an input for passing one of said multivibrator frequencies to provide an output at one voltage lever, and for rejecting the other of said multivibrator frequencies to provide an output at another voltage level; said second circuit means including:

a ramp generator for producing a ramp voltage which increases linearly with time;

means for turning said ramp generator on when said multivibrator changes from said second output voltage level to said first output voltage level;

means for turning said ramp generator off when said ramp voltage reaches a predetermined level; and means for generating a pulse when said ramp generator goes off, said pulse comprising said second multivibrator input signal.

2. A system as defined in claim 1 wherein said first circuit means includes a multiplier circuit producing a plurality of pulses for each cycle of said sinusoidal signal to provide a plurality of voltage level changes for each zero crossing.

3. A system as defined in claim 1 in which said first circuit means includes:

a limiter producing a generally square wave signal with a voltage level change for each zero crossing of said sinusoidal signal; and a multiplier circuit producing a pulse for each voltage level change of said square wave signal, with the pulse of a predetermined duration less than the minimum period of said sinusoidal signal.

4. A system as defined in claim 3 in which said first filter means includes amplifier means connected as an operational amplifier for passing said lower frequency and rejecting said higher frequency.

5. A system as defined in claim 4 in which said first circuit means includes amplifier means connected as an operational amplifier ahead of said limiter for passing a band including the frequencies of said sinusoidal signal and rejecting frequencies outside said band.

6. A system as defined in claim 1 wherein said first circuit means includes a multiplier circuit producing a plurality of pulses for each cycle of said sinusoidal signal to provide a plurality of voltage level changes for each zero crossing.

7. A system as defined in claim 1 in which said first circuit means includes:

band-pass filter means for passing a band including the frequencies of said sinusoidal signal and rejecting frequencies outside said band; and detector means having the output of said band-pass filter means connected as an input and producing a control signal when a signal is being received within the pass band and greater than a predetermined magnitude;

and in which said system includes a clamp circuit having said control signal as an input for maintaining the output of said first filter means at one of its output voltage levels in the absence of said control signal.

8. A system as defined in claim 5 in which said first circuit means includes detector means having the output of said amplifier means connected as an input and producing a control signal when a signal is being received within the pass band and greater than a predetermined magnitude;

and in which said system includes a clamp circuit having said control signal as an input for maintaining the output of said first filter means at one of its output voltage levels in the absence of said control signal.

9. A system as defined in claim 1 wherein said transmitter means includes:

oscillator means having a first input and operable at said one and said other frequencies in response to first and second voltage levels, respectively, at said input; and low-pass filter means having the output of said oscillator means as an input and including amplifier means connected as an operational amplifier, for converting the oscillator means output to a sinusoidal signal.

10. A system as defined in claim 7 wherein said transmitter means includes oscillator means having first and second inputs and operable at said one and said other frequency in response to first and second voltage levels, respectively, at said first input, and operable at a third frequency outside the pass band of said band-pass filter means in response to a third voltage level at said second input.

* * * * *